Nov. 27, 1951  C. J. WERNER  2,576,658
SHOCK ABSORBER
Filed Oct. 7, 1948

INVENTOR
CALVIN J. WERNER
BY HIS ATTORNEYS

Patented Nov. 27, 1951

2,576,658

UNITED STATES PATENT OFFICE 2,576,658

SHOCK ABSORBER

Calvin J. Werner, Dayton, Ohio, assignor to General Motors Corporation, Detroit, Mich., a corporation of Delaware Application October 7, 1948, Serial No. 53,366

2 Claims. (Cl. 188—88)

This invention relates to improvements in direct acting, hydraulic shock absorbers.

Direct acting, hydraulic shock absorbers are connected between the frame and axles of a motor vehicle for controlling the approaching and separating movements of said frame and axles. To cause them to operate more quietly and to permit hinge action and reduce wear, rubber grommets or sleeves are provided at each end connection of the shock absorber. Such rubber grommets or cushioning sleeves act as insulators, preventing the conduction of heat generated in the shock absorber by its continuous operation when the vehicle is driven. Thus the only manner in which heat in the shock absorber may be dissipated during operation is by direct radiation facilitated by the flow of air over and about the device.

The present invention has for one of its objects the provision of a direct acting, hydraulic shock absorber having an increased area subjected to air flow for heat dissipating purposes.

To increase the area subject to be contacted by air flow and by the heated fluid in the shock absorber, the present invention provides for the formation of inwardly extending grooves or recesses in the outer or fluid reservoir forming tube which surrounds the cylinder. This increases the surface contacted by the contained fluid and thereby increases heat dissipation by presenting a corresponding increased area exposed to the outside, cooling air.

These grooves are spirally formed to provide a spiral passage which causes the fluid, moving upwardly or downwardly in the reservoir, to flow through said elongated, spiral path with a swirling movement thereby causing all of the fluid to contact the entire inner, annular surface of the outer tube thus resulting in a more complete and greater dissipation of the heat in the shock absorber.

The spiral barrier formed in the outer tube also performs a second function. It dampens fluid agitation due to the shaking of the shock absorber during vehicle operation and thus reduces the mixing of the fluid with air in the upper, fluid empty region of the reservoir, in a manner similar to the well known baffle rings currently used in shock absorbers.

Consequently the present invention has for another of its objects the dampening of fluid movement due to shaking of the shock absorber during vehicle operation whereby fluid aeration is substantially eliminated, especially the fluid near the bottom of the fluid reservoir, where the working cylinder communicates with the fluid reservoir.

Further objects and advantages of the present invention will be apparent from the following description, reference being had to the accompanying drawings wherein a preferred embodiment of the present invention is clearly shown.

Figures 1, 2:
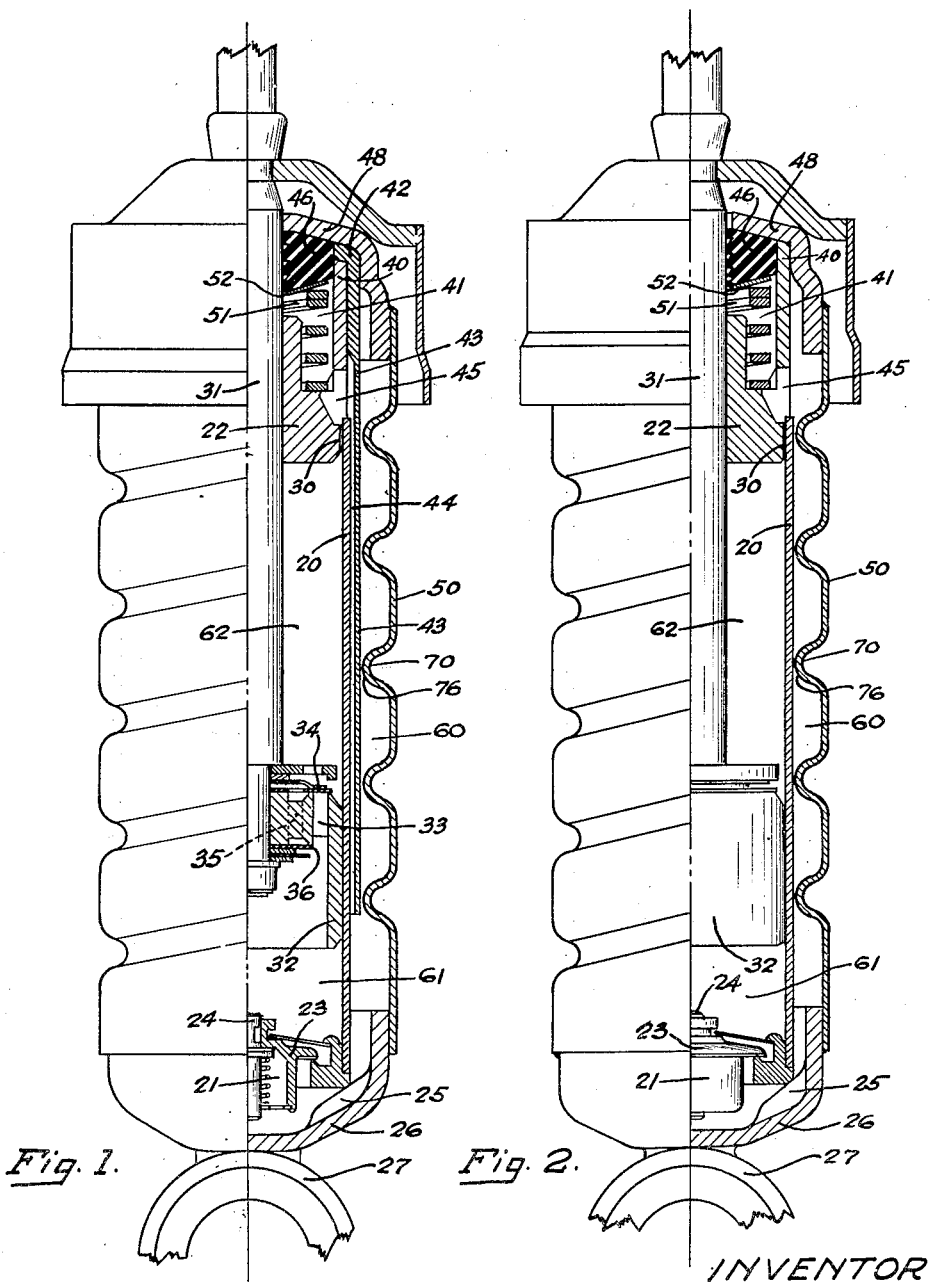
Fig. 1 is a longitudinal, half section of a direct acting, hydraulic shock absorber equipped with the present invention.
Fig. 2 is a partial section similar to the device of Fig. 1 in which, however, the baffle tube, immediately surrounding the working cylinder is eliminated.

Referring to the drawings and particularly Fig. 1 thereof, the shock absorber is shown having a cylinder 20, one end of which has a two directional control valve assembly 21 fitted therein, the other end having a closure member 22 fitted therein. The valve assembly 21 comprises an intake valve 23 movable to permit flow of fluid from the reservoir into the cylinder, and a fluid pressure relief valve 24 movable to permit a restricted flow of fluid from the cylinder into the reservoir.

The cylinder 20, fitting about the valve assembly 21, seats upon spaced, inwardly extending ribs 25 provided in the end cap 26. This end cap has a mounting ring 27 by means of which this end of the shock absorber may be attached to any suitable device whose movements the shock absorber is adapted to control, in motor vehicles preferably the axle of the vehicle.

The closure member 22 has a portion telescopically fitting into the end of the cylinder 20, the outer surface of said closure member having shallow grooves 30 for purposes to be described. The end closure member 22 has an opening in which the piston rod 31 is slidably supported, this piston rod carrying a piston 32 for reciprocation within the cylinder. The piston 32 has a plurality of through passages, one group designated by the numeral 33, being normally closed by a disc-valve 34, the other group 35 being normally closed by a disc-valve 36. Valve 34 moves to permit fluid flow through the piston passages 33 in response to downward movement of the piston in the cylinder and valve 36 to permit flow of fluid through the other passages 35 in response to upward movement of the piston in the cylinder.

The end closure member 22 has a tubular extension 40 forming a cup shaped chamber 41 above the cylinder. The inwardly extending, annular flange 42, formed on the tubular member 43, rests upon the outer edge of the annular extension 40 of the end closure member 22. Tubular member 43 surrounds the cylinder 20 and is so shaped as to form a narrow annular space 44 about the cylinder for a portion of its length. Fig. 1 shows the tube 43 terminating short of the end of the cylinder resting on the cover cap 26. An opening 45 in the end closure member 22 provides communication between the annular space 44 and the interior of the cup-shaped chamber 41. A resilient packing 46 encircles the piston rod 31 and fits snugly within the tubular extension of the end cover member 22, the inner annular edge of flange 42 of tube 43, also being sealingly engaged by the packing 46. A cover cap 48 has a portion fitted snugly about the tubular member 43 and in assembling the shock absorber said cover cap 48 is pressed upon the flange 42 of the tube 43 and upon the packing 46, thereby urging the end closure member 22 downwardly so that the cylinder seats and is rigidly held upon the inner ribs 25 of the closure member 26.

An outer tube 50 has one end fitted about the cover cap 48 and the other end about the cover cap 26, said outer tube being secured to said cover caps in any suitable manner such as welding or the like, thereby holding the entire assembly securely together. A spring 51 in the chamber 41 has one end seated upon the bottom surface of chamber 41 in the end closure member 22, the other end engaging and pressing upon the abutment collar 52, engaging the bottom or inner surface of packing 46 and exerting a pressure on the packing 46 so that it sealingly engages the inner surfaces of cover cap 48, the flange 42 of tube 43, the annular extension 40 of end closure member 22 and also encircles the piston rod 31. This packing seals chamber 41 against fluid leakage to the exterior of the shock absorber. The inside of cylinder 20 is in communication with the annular space 44 through the shallow grooves 30 in the outer annular surface of end closure member 22 and the opening 45 of said member.

The outer tubular member 50 surrounding the cylinder and its baffle tube 43 forms a fluid containing reservoir 60 about the cylinder, said reservoir being in communication with the working chamber 61 of the cylinder through the valve mechanism including the intake valve 23 and the pressure relief valve 24.

As the vehicle, upon which the shock absorber is mounted, is being operated over a road bed, the shock absorber is actuated so that its piston reciprocates in the cylinder, such reciprocation causing heat to be generated within the shock absorber which heat is transferred to the fluid therein. If this heat becomes excessive and is not properly dissipated the efficiency of the shock absorber to control vehicle axle and body movements will substantially be affected. Therefore it is desirable to dissipate the heat from the shock absorber as completely as possible. The heated fluid within shock absorber is cooled, by the dissipation of the heat through the outer, fluid reservoir tube which is constantly in the air stream as the vehicle is being operated. Thus cooling of the fluid may be facilitated by increasing the area of the reservoir tube surface.

To provide an increased area exposed to and contacted by the fluid and also the outside atmosphere the present invention provides for a groove in the tube, spiral in formation and forming an inwardly extending, spiral ridge which surrounds the baffle tube 43 if such a tube is provided as in Fig. 1, or surrounds the cylinder 20 directly in case no baffle tube is used as in Fig. 2. This increased surface exposed to the heated fluid within the reservoir correspondingly increases the radiation of the heat by the outer reservoir tube. The spiral ridge provides a barrier forming a spiral passage through which the fluid must pass as it rises and falls within the reservoir, thereby causing all of the fluid to engage the entire inner surface of the outer tube with a swirling, scrubbing action resulting in a more general and uniform transfer of heat from the fluid to the entire reservoir tube. This spiral groove in tube 50 is indicated by the numeral 70. The apex 76 of the groove clears the baffle tube 43 so that in commercial production the tube 43 may readily be inserted in and through the spirally ridged tube 50.

Air will at times be found within the shock absorber which, if mixed with the fluid therein and drawn into the working chamber of the shock absorber will appreciably impair the efficient operation of the device due to the compressibility of the air.

In the present shock absorber, as the piston moves downwardly fluid will be transferred from the working chamber 61 through the piston passages 33 into the upper working chamber 62 of the shock absorber. Due to the presence of the piston rod 31 in the upper chamber all of the fluid displaced by the piston in the lower chamber can not enter the upper chamber and thus the pressure relief valve 24 will be actuated to establish a restricted flow of fluid from the chamber 61 past the valve 24 into the end cover cap 26 and from there into the fluid reservoir 60. Reversed movement of the piston will cause fluid in chamber 62 to be transferred from said chamber through the piston passages 35 and their valve 36 into the lower chamber 61, a replenishing flow of the fluid being completed from the reservoir through the end cover cap 26 past the intake valve 23 into the chamber 61 to compensate for the smaller amount of fluid transfer from the rod containing chamber 62 into the chamber 61. Air in the fluid in the chamber 62 will, as the piston 32 moves upwardly, be forced through the narrow grooves 30 in the end closure member 22 and through opening 45 into the annular space 44 and through this space downwardly into the fluid contained within the fluid reservoir 60 inasmuch as tube 43 dips below the level of the fluid therein. After the air arrives in the reservoir it will rise through the fluid therein and lodge in the space 77 above the fluid in the reservoir.

A shock absorber of this kind when secured between the frame and axle of a motor vehicle for purposes of controlling the movements of said frame and axle is considerably shaken up during operation and thus air in the reservoir above the fluid level therein will be mixed with the fluid in said reservoir, such mixture, if permitted to continue, eventually causing aerated fluid to be present adjacent the bottom end of the shock absorber and particularly near the point of communication between the fluid reservoir and the lower working chamber 61. In order to prevent the mixture of air and fluid in the reservoir, especially during the operation of the shock absorber at which time the shock absorber is violently shaken up, it has been found advantageous to provide dampening means in the reservoir which retards fluid agitation in the reservoir caused by shaking of the shock absorber during operation on a motor vehicle.

The spiral ridge formed in the outer, reservoir tube 50 provides a barrier forming a spiral passage through which the fluid moves in the reservoir. This construction not only provides for increased cooling of the fluid within the reservoir but incidentally also dampens the movement of the fluid in the reservoir as a result of shaking of the shock absorber during vehicle operation. By retarding fluid agitation due to violent shaking of the shock absorber (cocktail shaker fashion), mixing of the air in the upper regions of the reservoir with the fluid therein is substantially reduced and aerated fluid is thus practically eliminated adjacent the area where the working cylinder communicates with the reservoir. This provides for a substantially solid, air free body of fluid available to the working cylinder and thus maintains substantially complete shock absorber efficiency by eliminating a compressible medium and making available only a non-compressible medium.

Thus the feature of the present invention resides in the provision of a spiral ridge in the outer reservoir tube 50 which ridge performs a dual function, first the ridge provides increased areas for heat transfer and dissipation as well as more uniform heat transfer; and second the ridge forms a barrier which dampens fluid agitation caused by violent shock absorber shaking and thus, if not completely preventing fluid and air mixture, at least confines fluid aeration to the upper regions of the reservoir or at fluid level and practically eliminates the presence of air in the fluid at the region of the reservoir where the working cylinder communicates with the reservoir.

While the embodiment of the present invention as herein disclosed, constitutes a preferred form, it is to be understood that other forms might be adopted.

What is claimed is as follows:

1. A direct acting type hydraulic shock absorber having a piston containing working cylinder, an outer tube surrounding the cylinder forming an annular, fluid containing reservoir about said cylinder, said reservoir being in communication with one end of said cylinder, an inner baffle tube within the fluid reservoir, forming a narrow annular space about the cylinder for a portion of its length, means providing communication between the other end of the cylinder and said narrow annular space and a spiral groove formed inwardly in said outer tube and extending in such close proximity to the baffle tube so as to substantially prevent longitudinal movement of fluid therein, thereby forcing all fluid to move in a spiral path for cooling said fluid and for preventing the aeration of the fluid normally induced by longitudinal fluid movement.

2. A direct acting hydraulic shock absorber having a piston containing cylinder; a fluid reservoir surrounding said cylinder, said reservoir having inner and outer annular walls; a tube forming the outer wall of the reservoir which is in communication with the cylinder for the transfer of fluid therebetween; and a spiral groove formed inwardly in said outer reservoir wall and extending in such close proximity to the inner reservoir wall so as to substantially prevent longitudinal movement of the fluid in the reservoir thereby forcing all fluid to move in a spiral path in said reservoir for cooling said fluid and preventing aeration of said fluid normally induced by longitudinal fluid movement.

CALVIN J. WERNER.

REFERENCES CITED

The following references are of record in the file of this patent:

UNITED STATES PATENTS

| Number | Name | Date |
|---|---|---|
| 1,628,900 | Neilsen | May 17, 1927 |
| 1,926,736 | Willgoos | Sept. 12, 1933 |
| 2,327,295 | Whisler | Aug. 17, 1943 |

FOREIGN PATENTS

| Number | Country | Date |
|---|---|---|
| 759,942 | France | Dec. 6, 1933 |